US012792024B2

(12) United States Patent
Ghergu et al.

(10) Patent No.: US 12,792,024 B2
(45) Date of Patent: Nov. 10, 2026

(54) ROBOTIC PROCESS AUTOMATION REALTIME DISASTER RECOVERY

(71) Applicant: INTERNATIONAL BUSINESS MACHINES CORPORATION, Armonk, NY (US)

(72) Inventors: Laurentiu Gabriel Ghergu, Bucharest (RO); Iasmina Boldea, Giroc (RO); Pavol Dobias, Melcice (SK); Diana Acsinia, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 18/476,254

(22) Filed: Sep. 27, 2023

(65) Prior Publication Data

US 2025/0103032 A1 Mar. 27, 2025

(51) Int. Cl.
*G05B 19/418* (2006.01)

(52) U.S. Cl.
CPC ... *G05B 19/41865* (2013.01); *G05B 19/4185* (2013.01)

(58) Field of Classification Search
CPC .................. B25J 9/1674; B25J 9/1661; G05B 2219/24182; G05B 19/0421; G05B 2219/24192; G05B 2219/39117; G05B 2219/40113; G05B 2219/40211; G05B 2219/50391; G05B 2223/02; G06F 11/07; G06F 11/2028; G06F 11/2033
See application file for complete search history.

(56) References Cited

U.S. PATENT DOCUMENTS 5,805,790 A * 9/1998 Nota .................. G06F 11/1402 714/10
6,170,044 B1 * 1/2001 McLaughlin ............ G05B 9/03 711/112
10,682,761 B2 6/2020 Geffen
11,048,598 B2 6/2021 Neichev
11,288,557 B2 * 3/2022 Gligan .................... G06F 16/93
11,303,562 B1 * 4/2022 Liu ......................... H04L 45/24
2009/0015404 A1 * 1/2009 Lin ........................ B25J 9/1682 340/540
2014/0040206 A1 2/2014 Ramakrishnan
2015/0293779 A1 * 10/2015 Gamer ................ G06F 11/2033 718/108
2018/0011766 A1 * 1/2018 Lee ..................... G06F 11/2048
(Continued)

FOREIGN PATENT DOCUMENTS

CN 112889044 A 6/2021
CN 113824764 A 12/2021
CN 113835881 A 12/2021

*Primary Examiner* — Darrin D Dunn
(74) *Attorney, Agent, or Firm* — CHIP LAW GROUP

(57) ABSTRACT

A computer-implemented method and system for performing a disaster recovery for robotic process automation (RPA) include a shared storage storing data of process steps of a workload executed by a first robotic agent in a first environment. A heartbeat module monitors the workload of the first robotic agent until a disaster event occurs during the workload. A restore module replicates the shared storage as a replicated shared storage in a second environment. The restore module recreates a context of the first robotic agent based on an execution of the workload by the first robotic agent at a time of the disaster event.

17 Claims, 5 Drawing Sheets

(56) References Cited

U.S. PATENT DOCUMENTS

| | | | | |
|---|---|---|---|---|
| 2018/0370033 | A1* | 12/2018 | Geffen | G06F 16/00 |
| 2018/0376317 | A1* | 12/2018 | Kim | H04L 63/102 |
| 2020/0001455 | A1* | 1/2020 | Chae | G06V 40/16 |
| 2021/0117302 | A1* | 4/2021 | Kadakia | G06F 11/3476 |
| 2021/0224729 | A1* | 7/2021 | Elazary | G05D 1/0287 |
| 2021/0247776 | A1* | 8/2021 | Faye | H04L 9/3271 |
| 2022/0147059 | A1* | 5/2022 | Borne-Pons | G05D 1/6985 |
| 2022/0258346 | A1* | 8/2022 | Hall | G06F 9/54 |
| 2023/0032516 | A1 | 2/2023 | Shrivastava | |
| 2023/0088591 | A1* | 3/2023 | Mujica | B25J 9/1674 700/78 |
| 2023/0321828 | A1* | 10/2023 | Ogawa | B25J 9/1664 700/245 |
| 2025/0103042 | A1* | 3/2025 | Wang | G05B 23/0286 |
| 2025/0153360 | A1* | 5/2025 | Wete Poaka | B25J 9/1661 |

* cited by examiner

ROBOTIC PROCESS AUTOMATION REALTIME DISASTER RECOVERY

BACKGROUND

Technical Field

The present disclosure generally relates to methods and systems for disaster recovery, and more particularly, to methods and systems for disaster recovery for robotic process automation (RPA) in realtime.

Description of the Related Art

Robotic Process Automation (RPA) is a form of enterprise process automation that uses software robots to replicate human actions when interacting with a system. The software robots (also called bots) learn by observing an individual performing a task and then, based on the observing, the robot reproduces that task. RPA, generally, eliminates repetitive, time consuming tasks for individuals. For enterprises, RPA generally reduces costs, improves consistency, quality, and scalability of production. These features make it an important asset for enterprises from a large variety of industries and therefore is rapidly becoming widespread.

SUMMARY

According to an embodiment of the present disclosure, a computer-implemented method for performing a disaster recovery for robotic process automation (RPA) includes a shared storage, a heartbeat module, and a restore module. The method includes storing, via the shared storage, data of process steps of a workload executed by a first robotic agent in a first environment. The heartbeat module then monitors the workload of the first robotic agent until a disaster event occurs during the workload. The restore module then replicates the shared storage as a replicated shared storage in a second environment. Once the restore module replicates the shared storage, the restore module then recreates a context of the first robotic agent based on an execution of the workload by first robotic agent at a time of the disaster event. The method is advantageous in that the replication of the RPA environment doesn't require human intervention, leading to time efficient processing within an RPA system.

In one embodiment, which can be combined with the previous embodiment, the method further includes creating, via the restore module, a second robotic agent in the second environment, where the second robotic agent is created based on a definition of the first robotic agent. By virtue of this feature, downtime for RPA robots during disaster events is avoided, leading to more efficient robotic process automation systems.

In one embodiment, which can be combined with one or more previous embodiments, the second robotic agent is created during at least one of: prior to the disaster event or after the disaster event. By virtue of this feature, a more resilient RPA system is provided.

In one embodiment, which can be combined with one or more previous embodiments, the method further includes maintaining, via network module, an intermediary network between first robotic agent and one or more external systems accessed by the first robotic agent, where a proxy is configured to impersonate the first robotic agent within the intermediary network in order to provide, to the second robotic agent, continuous access to the one or more external systems. By virtue of this feature, consistent process execution of an RPA system during the occurrence of a disaster event is provided.

In one embodiment, which can be combined with one or more previous embodiments, the method further includes performing, by the second robotic agent, one or more unfinished process steps of the workload of the first robotic agent, where the performing is based on at least one of: the context of the first robotic agent or a state of the intermediary network. By virtue of this feature, a more efficient robotic process automation system is provided, leading to the saving of computational resources.

In one embodiment, which can be combined with one or more previous embodiments, the context of the first robotic agent includes at least one of: a state of the first robotic agent at the time of the disaster event or a dependency of the state of the first robotic agent on completed portions of the workload of the first robotic agent. By virtue of this feature, a more efficient robotic process automation system is provided, leading to the saving of computational resources.

In one embodiment, which can be combined with one or more previous embodiments, the method further includes synchronizing at least one of the first robotic agent or the second robotic agent when at least one of the first robotic agent or the second robotic agent modifies an external environment external to the first environment and the second environment. By virtue of this feature, a more efficient robotic process automation system is provided, leading to the saving of computational resources.

According to an embodiment of the present disclosure, a computer program product for performing a disaster recovery for robotic process automation (RPA) is provided. The computer program product includes a computer readable storage medium embodying program instructions executable by a processor to cause the processor to perform a plurality of steps. A shared storage stores data of process steps of a workload executed by a first robotic agent in a first environment. A heartbeat module then monitors the workload of the first robotic agent until a disaster event occurs during the workload. A restore module then replicates the shared storage as a replicated shared storage in a second environment. Once the restore module replicates the shared storage, the restore module then recreates a context of the first robotic agent based on an execution of the workload by the first robotic agent at a time of the disaster event. The computer program product is advantageous in that the replication of the RPA environment doesn't require human intervention, leading to time efficient processing within an RPA system.

In one embodiment which can be combined with the previous embodiment, the computer program product further includes creating, via the restore module, a second robotic agent in the second environment, where the second robotic agent is created based on a definition of the first robotic agent. By virtue of this feature, downtime for RPA robots during disaster events is avoided, leading to more efficient robotic process automation systems.

In one embodiment, which can be combined with one or more previous embodiments, the second robotic agent is created during at least one of: prior to the disaster event or after the disaster event. By virtue of this feature, a more resilient RPA system is provided.

In one embodiment, which can be combined with one or more previous embodiments, the computer program product further includes maintaining, via network module, an intermediary network between first robotic agent and one or more external systems accessed by the first robotic agent, where a proxy is configured to impersonate the first robotic agent within the intermediary network in order to provide, to the second robotic agent, continuous access to the one or more external systems. By virtue of this feature, consistent process execution of an RPA system during the occurrence of a disaster event is provided.

In one embodiment, which can be combined with one or more previous embodiments, the computer program product further includes performing, by the second robotic agent, one or more unfinished process steps of the workload of the first robotic agent, where the performing is based on at least one of: the context of the first robotic agent or a state of the intermediary network. By virtue of this feature, a more efficient robotic process automation system is provided, leading to the saving of computational resources.

In one embodiment, which can be combined with one or more previous embodiments, the context of the first robotic agent includes at least one of: a state of the first robotic agent at the time of the disaster event or a dependency of the state of the first robotic agent on completed portions of the workload of the first robotic agent. By virtue of this feature, a more efficient robotic process automation system is provided, leading to the saving of computational resources.

According to an embodiment of the present disclosure, a computing system is provided. There is a processor and a computer-readable storage device coupled to the processor. A shared storage is coupled to a network module. A heartbeat module is coupled to the processor. A restore module is coupled to the processor. Program instructions are stored on the non-transitory computer-readable storage device for execution by the processor via a memory.

According to an embodiment of the present disclosure, a computing system, in conjunction with program instructions, is configured to perform a robotic process automation (RPA) disaster recovery method. The shared storage stores data of process steps of a workload executed by a first robotic agent in a first environment. The heartbeat module then monitors the workload of the first robotic agent until a disaster event occurs during the workload. The restore module then replicates the shared storage as a replicated shared storage in a second environment. Once the restore module replicates the shared storage, the restore module then recreates a context of the first robotic agent based on an execution of the workload by first robotic agent at a time of the disaster event. The computing system is advantageous in that the replication of the RPA environment doesn't require human intervention, leading to time efficient processing within an RPA system.

In one embodiment which can be combined with the previous embodiment, the computing system further includes creating, via the restore module, a second robotic agent in the second environment, where the second robotic agent is created based on a definition of the first robotic agent. By virtue of this feature, downtime for RPA robots during disaster events is avoided, leading to more efficient robotic process automation systems.

In one embodiment, which can be combined with one or more previous embodiments, the second robotic agent is created during at least one of: prior to the disaster event or after the disaster event. By virtue of this feature, a more resilient RPA system is provided.

In one embodiment, which can be combined with one or more previous embodiments, the computing system further includes maintaining, via network module, an intermediary network between first robotic agent and one or more external systems accessed by the first robotic agent, where a proxy is configured to impersonate the first robotic agent within the intermediary network in order to provide, to the second robotic agent, continuous access to the one or more external systems. By virtue of this feature, consistent process execution of an RPA system during the occurrence of a disaster event is provided.

In one embodiment, which can be combined with one or more previous embodiments, the computing system further includes performing, by the second robotic agent, one or more unfinished process steps of the workload of the first robotic agent, where the performing is based on at least one of: the context of the first robotic agent or a state of the intermediary network. By virtue of this feature, a more efficient robotic process automation system is provided, leading to the saving of computational resources.

In one embodiment, which can be combined with one or more previous embodiments, the context of the first robotic agent includes at least one of: a state of the first robotic agent at the time of the disaster event or a dependency of the state of the first robotic agent on completed portions of the workload of the first robotic agent. By virtue of this feature, a more efficient robotic process automation system is provided, leading to the saving of computational resources.

In one embodiment, which can be combined with one or more previous embodiments, the computing system further includes synchronizing at least one of the first robotic agent or the second robotic agent when at least one of the first robotic agent or the second robotic agent modifies an external environment external to the first environment and the second environment. By virtue of this feature, a more efficient robotic process automation system is provided, leading to the saving of computational resources.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
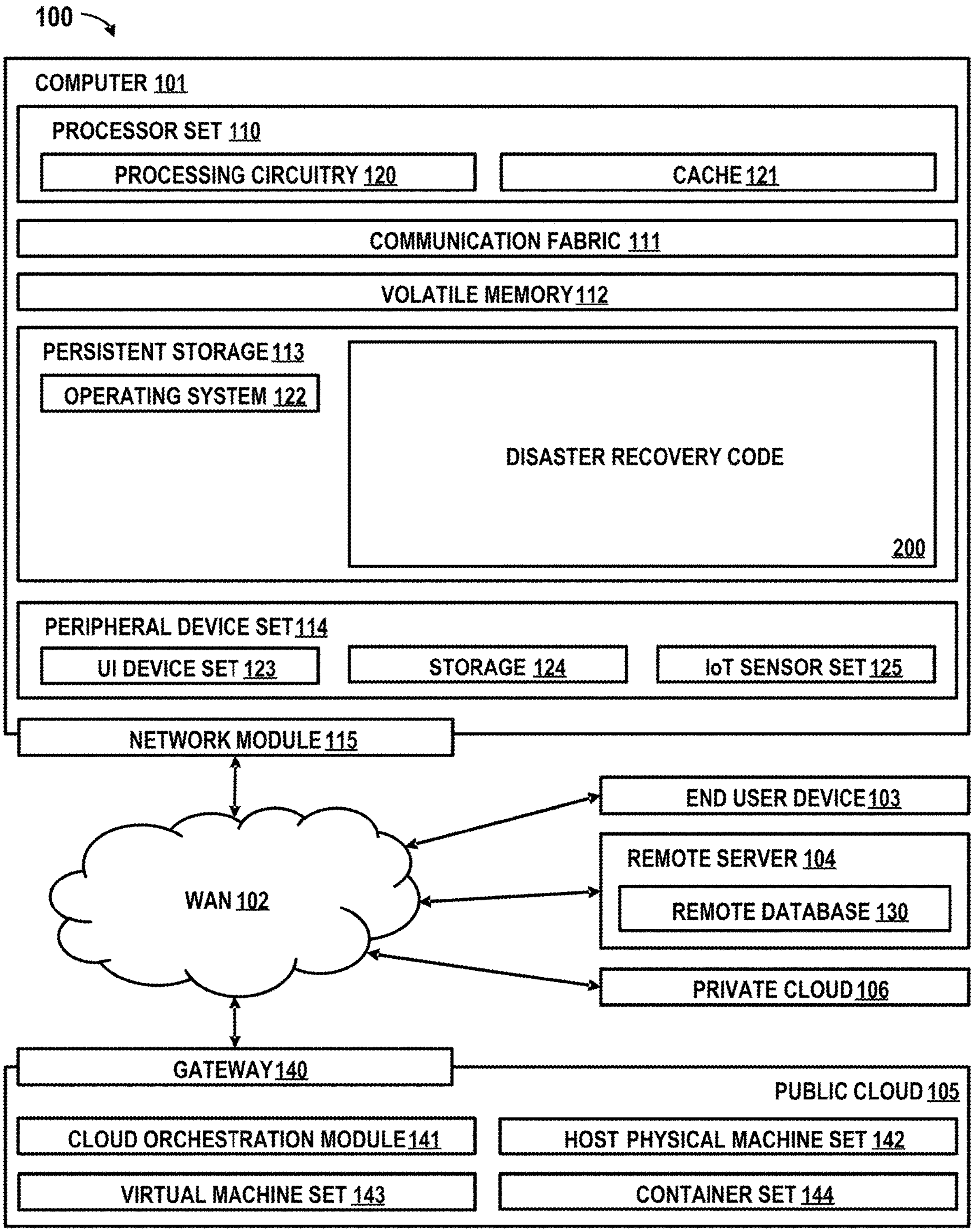
FIG. 1 is a functional block diagram illustration of a computing environment that can communicate with various networked components, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

For the RPA industry, available solutions typically do not allow for disaster recovery without restarting the running process on a given robot. More specifically, solutions approach disaster recovery in terms of systems backup and restore strategy. This means that when a disaster occurs, a primary robot will crash and be terminated even if it was in the middle of executing an RPA process. This approach can lead to inconsistencies as processes can include steps that are not idempotent (cannot be repeated once executed; for example, a step where a primary robot has added a new customer in a database through a web application) and restarting the processes from scratch in a disaster recovery location (alternative data center) may lead to inconsistencies. Additionally, depending on the criticality of the RPA solution, the system may not be able to accept large downtimes and should continue work in the secondary location without interruption (zero downtime).

Most solutions for dealing with disaster events describe how to ensure both high availability and disaster recovery for most critical databases or enterprise apps by using databases located in different geographical areas (with redundant power, networking, connectivity, and a replication mechanism in place) and/or a load balancer to distribute traffic using a specific algorithm. Some solutions use a reduced number of machines for a disaster recovery (DR) datacenter (considering it is provisioned for temporary use until the primary datacenter is rebuilt). Other solutions use a secondary site that has the same configuration and software as the primary site, where data is replicated from the primary site to the secondary site.

FIG. 1 is a functional block diagram illustration of a computing environment 100 that can communicate with various networked components, such as the cloud, a policy data source, etc. In particular, FIG. 1 illustrates a computing environment 100, as may be used to implement a component, such as, for example, a shared storage 245, a heartbeat module 210, and a restore module 270 discussed later in the context of FIG. 2.

Computing environment 100 includes an example of an environment for the execution of at least some of the computer code involved in performing the inventive methods, such as disaster recovery code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The present disclosure generally relates to computer-implemented methods for disaster recovery for robotic process automation (RPA). By virtue of the concepts discussed herein, workload monitoring up until a disaster event occurs and recreation of a context of a first robotic agent are utilized to perform disaster recovery for robotic process automation (RPA) in realtime.

Example Architecture

Figure 2:
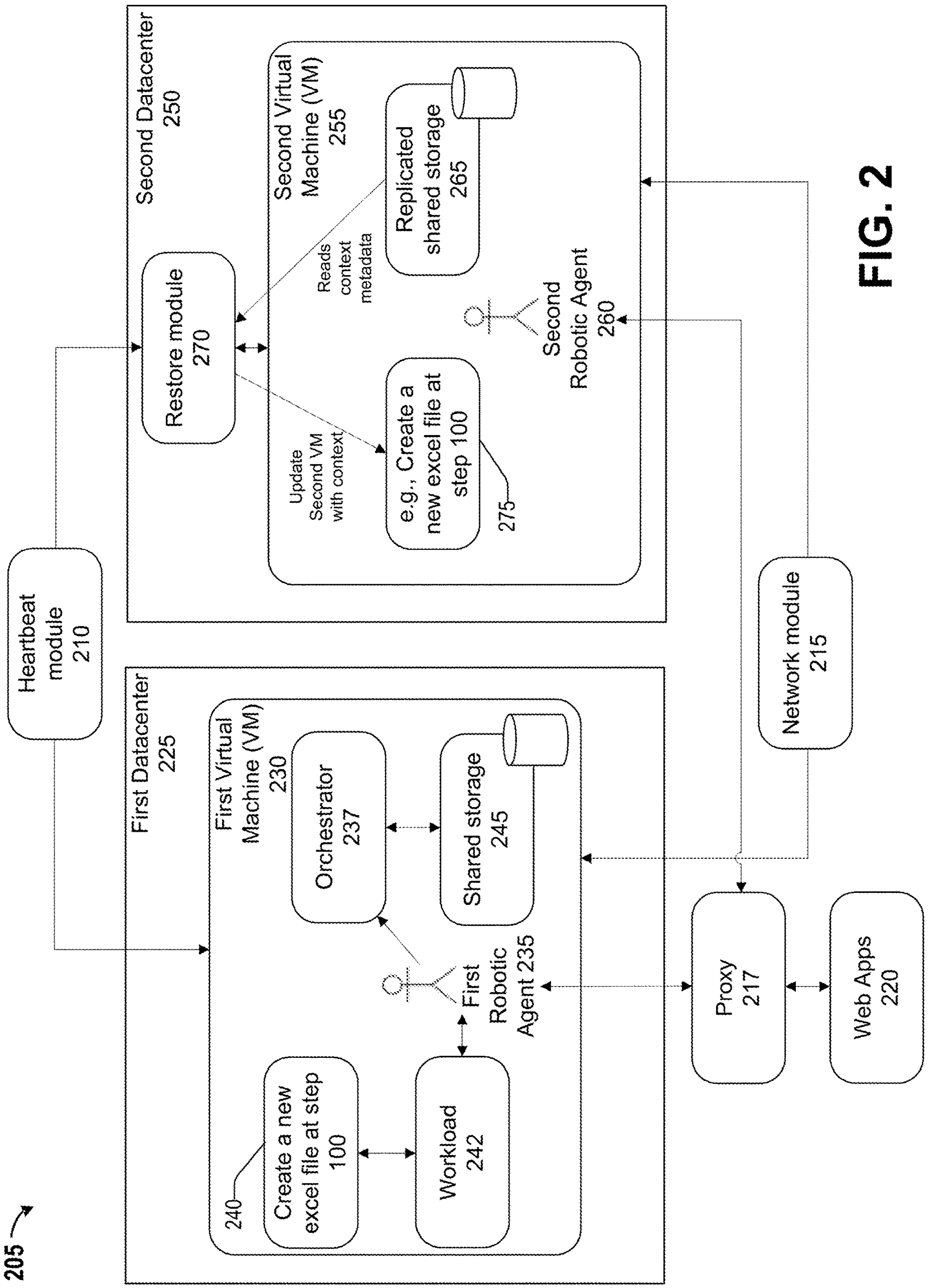
FIG. 2 presents a computing system for performing a disaster recovery for robotic process automation, consistent with an illustrative embodiment.

Reference is now made to FIG. 2, which presents a computing system 205 for performing a disaster recovery for robotic process automation, consistent with an illustrative embodiment. As shown, system 205 includes a first datacenter 225 (alternatively referred to as first environment 225), a second datacenter 250, a heartbeat module 210, a network module 215, a proxy 217, and web apps 220. For purposes of this disclosure, first datacenter 225 and second datacenter 250 can be alternatively referred to as "first environment 225" and "second environment 250".

Network module 215 provides coupling between various components of computing system 205 so that data relative to a workload 242 (of a first robotic agent 235) is shared between the components that are configured to perform disaster recovery for robotic process automation and include a shared storage 245, heartbeat module 210, and a restore module 270. Network module 215 is coupled to a processor (similar to processor set 110 of FIG. 1) to enable the processor communication over a network established by network module 215. Additionally, a non-transitory computer-readable storage device is coupled to the processor.

First environment 225 houses a first virtual machine (VM) 230 that includes the first robotic agent 235, the workload 242, and the shared storage 245. Workload 242 includes one or more process steps 240 executed/executable by the first robotic agent 235 (as shown, for example, "Create a new excel file at step 100") within first virtual machine 230. In other examples, process steps 240 can further include any of: file creation, database inserts, open browser, or type in command line. Shared storage 245 is configured to store, at least, data of process steps of workload 242 executed by first robotic agent 235 in first environment 225. The data can be sent, via heartbeat module 210, to second environment 250, where shared storage 245 is replicated as replicated shared storage 265 via restore module 270. In another example, shared storage 245 can store variables calculated in one or more process steps of workload 242 that can be utilized to make a call to a web service.

Heartbeat module 210 is coupled to the processor to enable the monitoring of workload 242 of the first robotic agent 235 until a disaster event occurs during the workload 242. The monitoring can be performed during a specific interval of time (referred to herein as a heartbeat), where a signal is sent to first robotic agent 235 from heartbeat module 210 and a response signal is sent from first robotic agent 235 to heartbeat module 210 during each heartbeat, such that heartbeat module 210 is informed that first robotic agent 235 is still performing workload 242. Once each heartbeat occurs, an orchestrator 237 receives output of a current process step of first robotic agent 235 and stores the output in shared storage 245. Heartbeat module 210 also identifies that first robotic agent 235 has stopped performing workload 242 when there is no response signal sent from first robotic agent 235 (occurrence of a disaster event) during a specific predetermined period (for example, a certain number of seconds). Once the decision is made by heartbeat module 210 that first robotic agent 235 has stopped working, restore module 270 is triggered to perform one or more actions. In addition, depending on the functioning mode of restore module 210, restore module 210 is configured to create a second robotic agent 260 within second environment 250 during either of: as soon as first robotic agent 235 begins workload 242 or once first robotic agent 235 stops performing workload 242.

Restore module 270, is coupled to the processor to enable recreation (once triggered) of a context of the first robotic agent 235 based on an execution of workload 242 by first robotic agent 235 at the time of the disaster event. The recreation is carried out using at least one of: replicated shared storage 265, the current process step of workload 242 (the process step that first robotic agent 235 left off on), or the definition of first robotic agent 235. Additionally, restore module 270 creates a second virtual machine (VM) 255 and all artifacts created by first robotic agent 235. When restore module 210 is configured to create second robotic agent 260 within second environment 250 once first robotic agent 235 stops performing workload 242, restore module is further configured to keep second robotic agent 260 synched, where second robotic agent uses the output of first robotic agent 235 from replicated shared storage 265.

Proxy 217 is coupled to first robotic agent 235 and acts as an intermediary between first robotic agent 235 and one or more external systems that the first robotic agent 235 is accessing (such as, for example, web apps 220). When first robotic agent 235 stops running (a disaster event occurs), second robotic agent 260 is configured to pick up the connection to the one or more external systems.

Program instructions (sometimes referred to as disaster recovery code at block 200 of FIG. 1) stored on the non-transitory computer-readable storage device are configured for execution by the processor via a memory (similar to the volatile memory 112 of FIG. 1) coupled to the processor. The instructions are configured to render computing system 205 capable of performing a number of operations in a computer-implemented method for performing disaster recovery for robotic process automation (presented similarly in FIG. 5). The method includes storing, via the shared storage 245, data of process steps of a workload 242 executed by first robotic agent 235 in first environment 225. The heartbeat module 210 then monitors the workload 242 of first robotic agent 235 until a disaster event occurs during the workload 242. The restore module 270 then replicates the shared storage 245 as a replicated shared storage 265 in the second environment 250. Once the restore module 270 replicates the shared storage 245, the restore module 270 recreates a context of the first robotic agent 235 based on an execution of the workload 242 by first robotic agent 235 at a time of the disaster event. The computing system 205/method is advantageous in that the replication of the RPA environment doesn't require human intervention, leading to time efficient processing within an RPA system.

In one embodiment, execution of the instructions by the processor configures computing system 205 to additionally perform creating, via the restore module 210, a second robotic agent 260 in the second environment 250, where the second robotic agent 260 is created based on a definition of the first robotic agent 235. By virtue of this feature, downtime for RPA robots during disaster events is avoided, leading to more efficient robotic process automation systems.

In one embodiment, the second robotic agent 260 is created during at least one of: prior to the disaster event or after the disaster event. By virtue of this feature, a more resilient RPA system is provided.

In one embodiment, execution of the instructions by the processor configures computing system 205 to additionally perform maintaining, via network module 215, an intermediary network between first robotic agent 235 and one or more external systems accessed by the first robotic agent 235, where a proxy is configured to impersonate the first robotic agent 235 within the intermediary network in order to provide, to the second robotic agent 260, continuous access to the one or more external systems. By virtue of this feature, consistent process execution of an RPA system during the occurrence of a disaster event is provided.

In one embodiment, execution of the instructions by the processor configures computing system 205 to additionally perform performing, by the second robotic agent 260, one or more unfinished process steps of the workload 242 of the first robotic agent 235, where the performing is based on at least one of: the context of the first robotic agent 235 or a state of the intermediary network. By virtue of this feature, a more efficient robotic process automation system is provided, leading to the saving of computational resources.

In one embodiment, the context of the first robotic agent 235 includes at least one of: a state of the first robotic agent 235 at the time of the disaster event or a dependency of the state of the first robotic agent 235 on completed portions of the workload 242 of the first robotic agent 235. By virtue of this feature, a more efficient robotic process automation system is provided, leading to the saving of computational resources.

In one embodiment, execution of the instructions by the processor configures computing system 205 to additionally perform synchronizing at least one of the first robotic agent 235 or the second robotic agent 260 when at least one of the first robotic agent 235 or the second robotic agent 260 modifies an external environment external to the first environment 225 and the second environment 250. By virtue of this feature, a more efficient robotic process automation system is provided, leading to the saving of computational resources.

According to an embodiment, a computer program product for performing disaster recovery for robotic process automation is provided. The computer program product includes a computer readable storage medium embodying program instructions executable by a processor to cause the processor to perform a plurality of steps. These steps may correlate to any process steps/functions relative to any of FIGS. 3-5.

Figure 3:
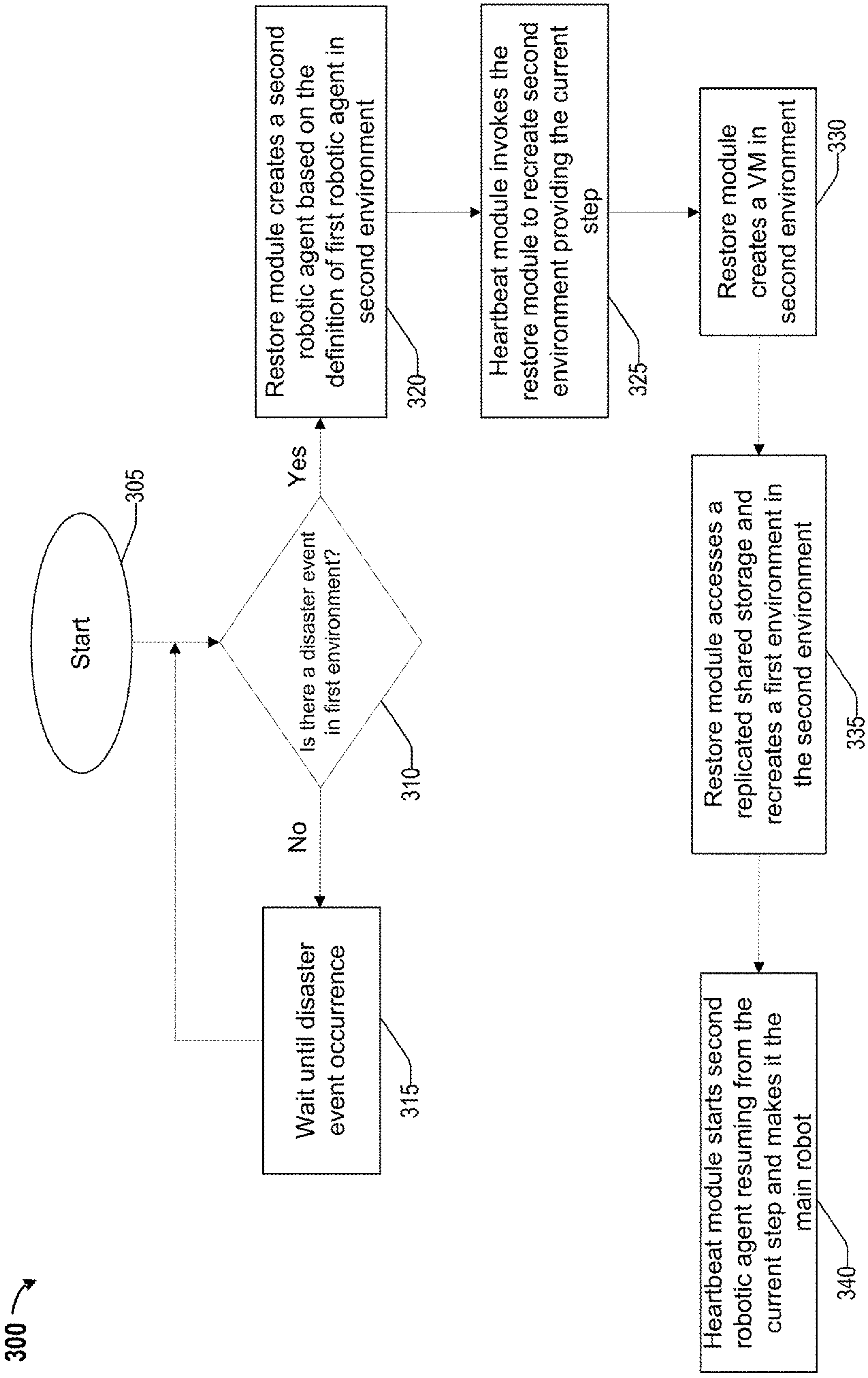
FIG. 3 is a flowchart showing an exemplary workflow of a low resources mode of the computing system of FIG. 2, consistent with an illustrative embodiment.

Reference is now made to FIG. 3, which is a flowchart 300 showing an exemplary workflow of a low resources mode of the computing system 205 of FIG. 2, consistent with an illustrative embodiment. For discussion purposes, the flowchart 300 is described with reference to the architecture of environment 100 and computing system 205 of FIGS. 1 and 2. It is noted that in relation to the low resources mode of computing system 205, restore module 210 creates second robotic agent 260 once a disaster event occurs in first environment 225.

As shown, at block 305, a low resources mode of computing system 205 is initiated.

At block 310, heartbeat module 210 identifies if a disaster event has occurred in first environment 225. If a disaster event has not occurred in first environment 225, then, at block 315, heartbeat module 210 continues to monitor first environment 225 until a disaster event occurs during the carrying out of workload 242 by first robotic agent 235.

Upon determining that a disaster event has occurred in first environment 225, then, at block 320, restore module 210 creates a second robotic agent 260 based on the definition of first robotic agent 235 in a second environment 250.

At block 325, heartbeat module 210 invokes a restore module 270 to recreate the second environment 250 while providing data relative to the current process step that the first robotic agent 235 left off on when a disaster event occurred in first environment 225.

At block 330, restore module 270 creates a second virtual machine 255 within second environment 250.

At block 335, restore module 270 accesses a replicated shared storage 265 and recreates first environment 225 within second environment 250 in the context of the current process step that the first robotic agent 235 left off on when a disaster event occurred in first environment 225.

At block 340, heartbeat module 210 starts the second robotic agent 260 from the current process step that the first robotic agent 235 left off on when the disaster event occurred and makes second robotic agent 260 the main robot running workload 242.

Figure 4:
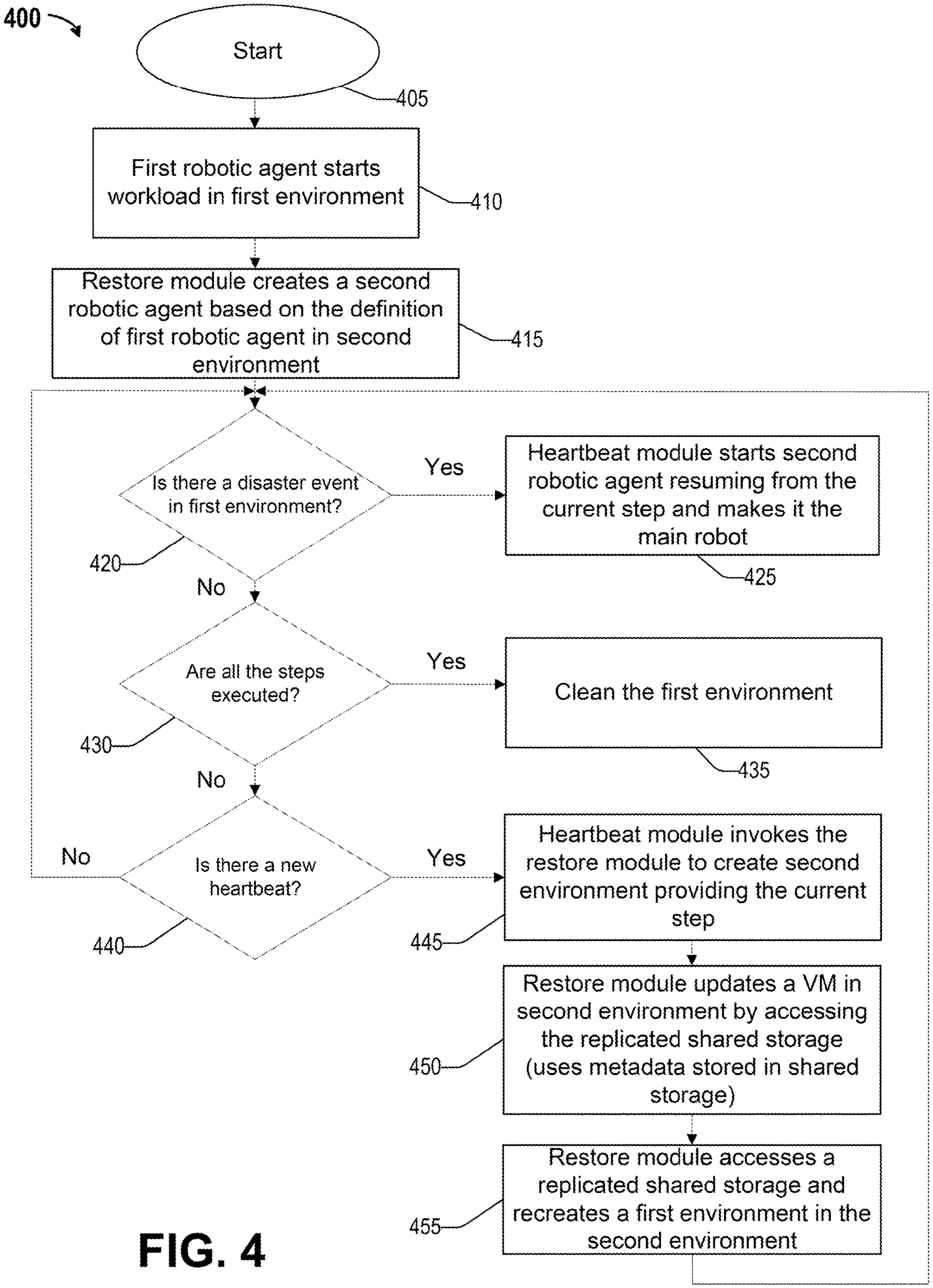
FIG. 4 is a flowchart showing an exemplary workflow of a zero downtime mode of the computing system of FIG. 2, consistent with an illustrative embodiment.

Reference is now made to FIG. 4, which is a flowchart 400 showing an exemplary workflow of a zero downtime mode of the computing system 205 of FIG. 2, consistent with an illustrative embodiment. For discussion purposes, the flowchart 400 is described with reference to the architecture of environment 100 and computing system 205 of FIGS. 1 and 2. It is noted that in relation to the zero downtime mode of computing system 205, restore module 210 creates second robotic agent 260 prior to a disaster event occurrence in first environment 225.

As shown, at block 405, a zero downtime mode of computing system 205 is initiated.

At block 410, a first robotic agent 235 begins a workload 242 in first environment 225.

At block 415, restore module 210 creates a second robotic agent 260 based on the definition of first robotic agent 235 in a second environment 250.

At block 420, heartbeat module 210 identifies if a disaster event has occurred in first environment 225. Upon determining that a disaster event has occurred in first environment 225, then, at block 425, heartbeat module starts second robotic agent 260 from the current process step that the first robotic agent 235 left off on when the disaster event occurred and makes second robotic agent 260 the main robot running workload 242.

Upon determining that a disaster event has not occurred in first environment 225, then, at block 430, heartbeat module 210 queries whether all steps in workload 242 have been executed by first robotic agent 235. If all steps in workload 242 have been executed by first robotic agent 235, then, at block 435, the first environment 225 is cleaned.

Upon determining that all steps in workload 242 have not been executed by first robotic agent 235, then, at block 440, heartbeat module 210 queries whether there is a new heartbeat in relation to second robotic agent 260 (signal sent from second robotic agent 260 to heartbeat module 210 in response to heartbeat module 210 sending a signal to second robotic agent 260 so heartbeat module 210 recognizes whether second robotic agent 260 is performing workload 242 or not). Upon determining that there is not a new heartbeat in relation to second robotic agent 260, then heartbeat module 210 continues to identify if a disaster event has occurred in first environment 225 (block 420).

Upon determining that there is a new heartbeat in relation to second robotic agent 260, then, at block 445, heartbeat module 210 invokes a restore module 270 to recreate the second environment 250 while providing data relative to the current process step that the first robotic agent 235 left off on when a disaster event occurred in first environment 225.

At block 450, restore module 270 updates a second virtual machine 255 in second environment 250 by accessing a replicated shared storage 265 (data of shared storage 245 from first environment 225 is used to provide context to second virtual machine 255).

At block 455, restore module 270 accesses a replicated shared storage 265 and recreates first environment 225 within second environment 250 in the context of the current process step that the first robotic agent 235 left off on when a disaster event occurred in first environment 225. After the first environment 225 is recreated within the second environment 250, heartbeat module 210 continues to identify if a disaster event has occurred in first environment 225 (block 420).

Further in relation to zero downtime mode of computing system 205, first robotic agent 235 and second robotic agent 260 can be run in parallel. When run in parallel, only first robotic agent 235 interacts with one or more external systems; second robotic agent 260 will have access to the one or more external systems via the syncing of second environment 250 with first environment 225.

Figure 5:
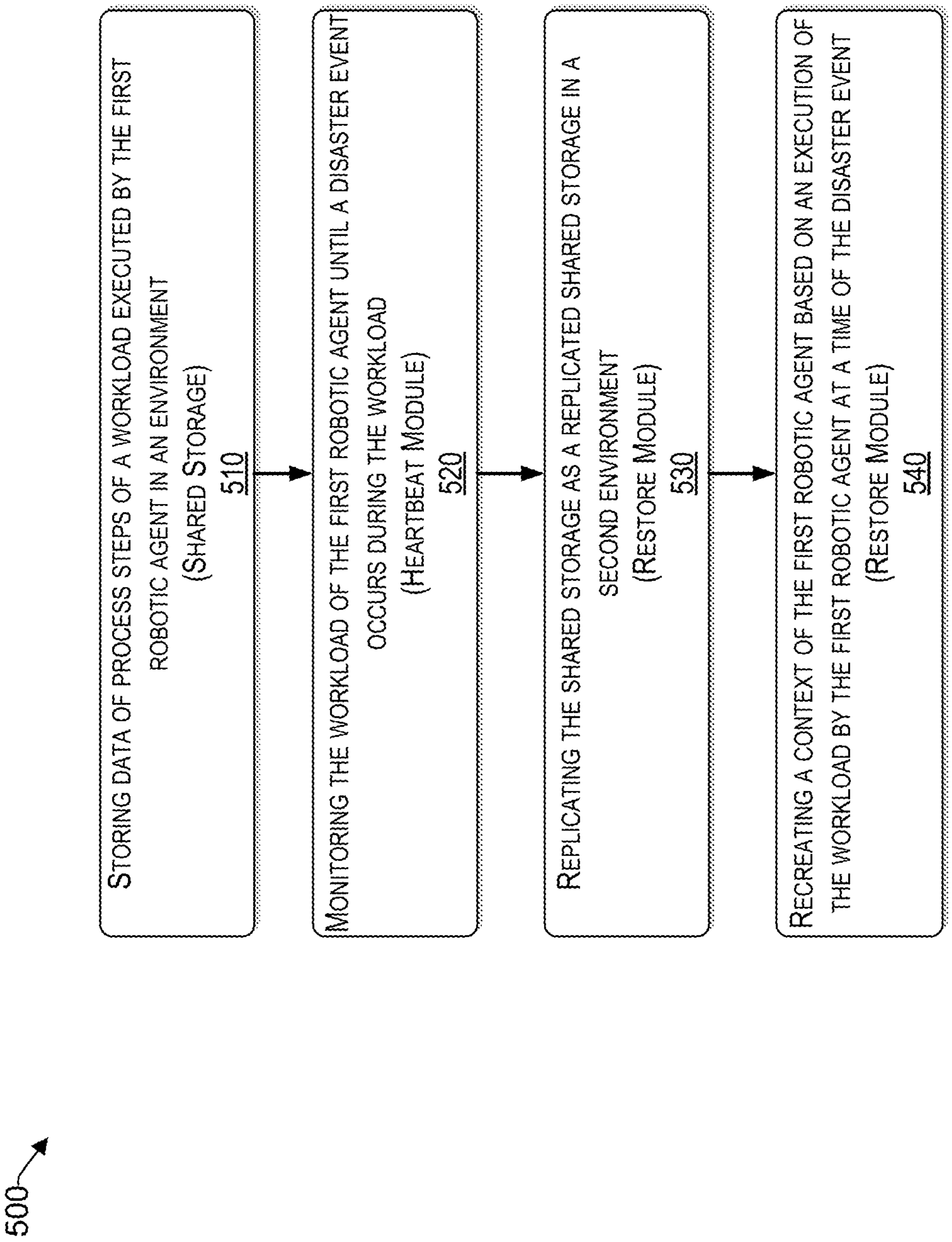
FIG. 5 is a flowchart for a computer-implemented method for performing a disaster recovery for robotic process automation, consistent with an illustrative embodiment.

With the foregoing overview of the example architecture/environment/computing system 100, 205, it may be helpful to consider a high-level discussion of an example process. To that end FIG. 5 presents a flowchart 500 for a computer-implemented method for performing a disaster recovery for robotic process automation, consistent with an illustrative embodiment.

Flowchart 500 is illustrated as a process in logical flowchart format, wherein the flowchart represents a sequence of operations that can be implemented in hardware, software, or a combination thereof. In the context of software, the process represents computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the computer-implemented method for performing a disaster recovery for robotic process automation is described with reference to the architecture of environment 100 and computing system 205 of FIGS. 1 and 2.

At block 510, a shared storage 245 stores data of process steps of a workload 242 executed by a first robotic agent 235 in a first environment 225.

At block 520, a heartbeat module 210 monitors the workload 242 of the first robotic agent 235 until a disaster event occurs during the workload 242.

At block 530, a restore module 270 replicates the shared storage 245 as a replicated shared storage 265 in the second environment 250.

At block 540, a restore module 270 recreates a context of the first robotic agent 235 based on an execution of the workload 242 by the first robotic agent 235 at a time of the disaster event. The method is advantageous in that the replication of the RPA environment doesn't require human intervention, leading to time efficient processing within an RPA system.

In one embodiment, the integration workflow of flowchart 500 further includes creating, via the restore module 210, a second robotic agent 260 in the second environment 250, where the second robotic agent 260 is created based on a definition of the first robotic agent 235. By virtue of this feature, downtime for RPA robots during disaster events is avoided, leading to more efficient robotic process automation systems.

In one embodiment, the second robotic agent 260 is created during at least one of: prior to the disaster event or after the disaster event. By virtue of this feature, a more resilient RPA system is provided.

In one embodiment, the integration workflow of flowchart 500 further includes maintaining, via network module 215, an intermediary network between first robotic agent 235 and one or more external systems accessed by the first robotic agent 235, where a proxy is configured to impersonate the first robotic agent 235 within the intermediary network in order to provide, to the second robotic agent 260, continuous access to the one or more external systems. By virtue of this feature, consistent process execution of an RPA system during the occurrence of a disaster event is provided.

In one embodiment, the integration workflow of flowchart 500 further includes performing, by the second robotic agent 260, one or more unfinished process steps of the workload 242 of the first robotic agent 235, where the performing is based on at least one of: the context of the first robotic agent 235 or a state of the intermediary network. By virtue of this feature, a more efficient robotic process automation system is provided, leading to the saving of computational resources.

In one embodiment, the context of the first robotic agent 235 includes at least one of: a state of the first robotic agent 235 at the time of the disaster event or a dependency of the state of the first robotic agent 235 on completed portions of the workload 242 of the first robotic agent 235. By virtue of this feature, a more efficient robotic process automation system is provided, leading to the saving of computational resources.

In one embodiment, the integration workflow of flowchart 500 further includes synchronizing at least one of the first robotic agent 235 or the second robotic agent 260 when at least one of the first robotic agent 235 or the second robotic agent 260 modifies an external environment external to the first environment 225 and the second environment 250. By virtue of this feature, a more efficient robotic process automation system is provided, leading to the saving of computational resources.

For the purposes of this disclosure, an "external environment" may refer to any of: web services, queue, external file systems, network attachment systems, websites, or databases. In further embodiments, an "external environment" includes one or more systems that rely on either of: TCP communication or UDP communication.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more components within the system. Additionally, one or more of the methodologies discussed herein may obviate a need for environment and bot recreation in relation to robotic process automation. This may have the technical effect of reducing downtime during the occurrence of disaster events (leading to more efficient robotic process automation systems) and also reducing computing resources that would normally be used to get a robotic process automation system running again after the disaster event). Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for performing a disaster recovery for robotic process automation (RPA) using a shared storage, a heartbeat module, and a restore module, the computer-implemented method comprising:

storing, via the shared storage, data of process steps of a workload executed by a first robotic agent in a first virtual machine, wherein the first virtual machine is in a first environment, and the data of the process steps is stored at each time interval of a plurality of time intervals associated with the heartbeat module;

monitoring, by the heartbeat module, the workload of the first robotic agent until a disaster event occurs during the workload, wherein the heartbeat module determines the occurrence of the disaster event and identifies that the first robotic agent has stopped execution of the workload;

replicating, by the restore module, the shared storage as a replicated shared storage in a second environment;

recreating, by the restore module, a context of the first robotic agent based on the execution of the workload by the first robotic agent at a time of the disaster event;

creating, by the restore module, a second virtual machine in the second environment;

creating, by the restore module based on the first robotic agent, a second robotic agent in the second virtual machine; and updating, by the restore module based on the monitoring of the workload of the first robotic agent, the second virtual machine by accessing the replicated shared storage.

2. The computer-implemented method of claim 1, wherein the second robotic agent is created based on a definition of the first robotic agent.

3. The computer-implemented method of claim 2, further comprising maintaining, via a network module, an intermediary network between the first robotic agent and one or more external systems accessed by the first robotic agent, wherein a proxy is configured to impersonate the first robotic agent within the intermediary network to provide, to the second robotic agent, continuous access to the one or more external systems.

4. The computer-implemented method of claim 3, further comprising performing, by the second robotic agent, one or more unfinished process steps of the workload of the first robotic agent, wherein the performing is based on at least one of: the context of the first robotic agent or a state of the intermediary network.

5. The computer-implemented method of claim 4, wherein the context of the first robotic agent is selected from the group consisting of: a state of the first robotic agent at the time of the disaster event and a dependency of the state of the first robotic agent on completed portions of the workload of the first robotic agent.

6. The computer-implemented method of claim 2, further comprising synchronizing at least one of the first robotic agent or the second robotic agent when at least one of the first robotic agent or the second robotic agent modifies an external environment external to the first environment and the second environment.

7. A computer program product for performing a disaster recovery for robotic process automation (RPA), the computer program product comprising a computer readable storage medium having program instructions embodied therewith, the program instructions executable by a processor to cause the processor to perform:

storing, via a shared storage, data of process steps of a workload executed by a first robotic agent in a first virtual machine, wherein
the first virtual machine is in a first environment, and
the data of the process steps is stored at each time interval of a plurality of time intervals associated with a heartbeat module;

monitoring, by the heartbeat module, the workload of the first robotic agent until a disaster event occurs during the workload, wherein the heartbeat module determines the occurrence of the disaster event and identifies that the first robotic agent has stopped execution of the workload;

replicating, by a restore module, the shared storage as a replicated shared storage in a second environment;

recreating, by the restore module, a context of the first robotic agent based on the execution of the workload by the first robotic agent at a time of the disaster event;

creating, by the restore module, a second virtual machine in the second environment;

creating, by the restore module based on the first robotic agent, a second robotic agent in the second environment; and updating, by the restore module based on the monitoring of the workload of the first robotic agent, the second virtual machine by accessing the replicated shared storage.

8. The computer program product of claim 7, wherein the second robotic agent is created based on a definition of the first robotic agent.

9. The computer program product of claim 8, wherein the program instructions further cause the processor to perform maintaining, via a network module, an intermediary network between the first robotic agent and one or more external systems accessed by the first robotic agent, wherein a proxy is configured to impersonate the first robotic agent within the intermediary network to provide, to the second robotic agent, continuous access to the one or more external systems.

10. The computer program product of claim 9, wherein the program instructions further cause the processor to perform performing, by the second robotic agent, one or more unfinished process steps of the workload of the first robotic agent, wherein the performing is based on at least one of: the context of the first robotic agent or a state of the intermediary network.

11. The computer program product of claim 10, wherein the context of the first robotic agent is selected from the group consisting of: a state of the first robotic agent at the time of the disaster event and a dependency of the state of the first robotic agent on completed portions of the workload of the first robotic agent.

12. A computing system, comprising:

a processor;

a computer-readable storage device coupled to the processor;

a shared storage coupled to a network module;

a heartbeat module coupled to the processor;

a restore module coupled to the processor; and program instructions stored on the computer-readable storage device for execution by the processor via a memory, wherein the execution of the program instructions by the processor configures the processor to perform a robotic process automation (RPA) disaster recovery method comprising:

storing, via the shared storage, data of process steps of a workload executed by a first robotic agent in a first virtual machine, wherein
the first virtual machine is in a first environment, and
the data of the process steps is stored at each time interval of a plurality of time intervals associated with the heartbeat module;

monitoring, by the heartbeat module, the workload of the first robotic agent until a disaster event occurs during the workload, wherein the heartbeat module determines the occurrence of the disaster event and identifies that the first robotic agent has stopped execution of the workload;

replicating, by the restore module, the shared storage as a replicated shared storage in a second environment;

recreating, by the restore module, a context of the first robotic agent based on the execution of the workload by the first robotic agent at a time of the disaster event;

creating, by the restore module, a second virtual machine in the second environment;

creating, by the restore module based on the first robotic agent, a second robotic agent in the second virtual machine; and updating, by the restore module based on the monitoring of the workload of the first robotic agent, the second virtual machine by accessing the replicated shared storage.

13. The computing system of claim 12, wherein the second robotic agent is created based on a definition of the first robotic agent.

14. The computing system of claim 13, the RPA disaster recovery method further comprising maintaining, via the network module, an intermediary network between the first robotic agent and one or more external systems accessed by the first robotic agent, wherein a proxy is configured to impersonate the first robotic agent within the intermediary network to provide, to the second robotic agent, continuous access to the one or more external systems.

15. The computing system of claim 14, the RPA disaster recovery method further comprising performing, by the second robotic agent, one or more unfinished process steps of the workload of the first robotic agent, wherein the performing is based on at least one of: the context of the first robotic agent or a state of the intermediary network.

16. The computing system of claim 15, wherein the context of the first robotic agent is selected from the group consisting of: a state of the first robotic agent at the time of the disaster event and a dependency of the state of the first robotic agent on completed portions of the workload of the first robotic agent.

17. The computing system of claim 13, the RPA disaster recovery method further comprising synchronizing at least one of the first robotic agent or the second robotic agent when at least one of the first robotic agent or the second robotic agent modifies an external environment external to the first environment and the second environment.

* * * * *